(12) United States Patent
Providence

(10) Patent No.: US 11,992,109 B1
(45) Date of Patent: May 28, 2024

(54) SHAMPOO STAND

(71) Applicant: Ayanna Providence, West Palm Beach, FL (US)

(72) Inventor: Ayanna Providence, West Palm Beach, FL (US)

( * ) Notice: Subject to any disclaimer, the term of this patent is extended or adjusted under 35 U.S.C. 154(b) by 0 days.

(21) Appl. No.: 18/106,744

(22) Filed: Feb. 7, 2023

(51) Int. Cl.
A45D 44/14 (2006.01)
F16M 11/40 (2006.01)
A45D 44/00 (2006.01)

(52) U.S. Cl.
CPC ............. A45D 44/14 (2013.01); F16M 11/40 (2013.01); *A45D 44/00* (2013.01)

(58) Field of Classification Search
CPC ........ A45D 44/14; A45D 44/00; A45D 44/04; A45D 44/10; F16M 11/40
USPC .......................................................... 248/160
See application file for complete search history.

(56) References Cited

U.S. PATENT DOCUMENTS

| | | | | |
|---|---|---|---|---|
| 2,416,812 A * | 3/1947 | Bailey | ................... | A61J 9/0692 248/104 |
| 2,510,198 A * | 6/1950 | Tesmer | ................... | B25B 5/006 248/231.71 |
| 2,597,670 A * | 5/1952 | Pinto | ....................... | H04M 1/06 248/122.1 |
| 3,586,281 A * | 6/1971 | Schumer | ................. | A47F 7/065 248/231.71 |
| 3,934,804 A * | 1/1976 | Bruce | ..................... | A45D 44/14 223/66 |
| 4,114,847 A * | 9/1978 | Bogensberger | ....... | A61J 9/0638 248/104 |
| 5,054,729 A | 10/1991 | Mogi | | |
| 5,156,365 A * | 10/1992 | McCaig | ............... | F16M 13/022 248/231.71 |
| 5,163,752 A * | 11/1992 | Copeland | ........... | F21V 21/0832 362/396 |
| 5,192,041 A * | 3/1993 | Bryant | .................. | A61J 9/0684 248/104 |
| 5,276,596 A * | 1/1994 | Krenzel | ................ | F16M 11/40 362/396 |
| 5,603,479 A * | 2/1997 | Kristy | .................. | F16M 11/041 248/104 |
| 5,699,988 A * | 12/1997 | Boettger | .................. | A61G 7/05 248/316.1 |
| 5,749,602 A * | 5/1998 | Delaney | ................ | B01D 46/42 285/64 |
| 5,762,306 A * | 6/1998 | Day | ...................... | G06F 3/0395 345/157 |

(Continued)

*Primary Examiner* — Nkeisha Smith
(74) *Attorney, Agent, or Firm* — Sanchelima & Associates, PA; Christian Sanchelima; Jesus Sanchelima

(57) ABSTRACT

A shampoo stand including a neck assembly, a joining assembly, and a support assembly. The neck assembly includes a support, a clamping lock, a strap, and a neck support, wherein the support fits into the open bottom of the mannequin head. The L-shaped neck support provides support to the lateral of the mannequin's neck and is secured by means of the strap that surrounds the mannequin's neck and is blocked by the quick-release mechanism of the clamping lock. The joining assembly includes a semi-rigid and flexible gooseneck, where the gooseneck can retain a predetermined position, thereby the mannequin head can be handled as the user considers appropriate by coupling the gooseneck to a suitable furniture by means of a clamp attached to a bottom edge of the gooseneck.

3 Claims, 3 Drawing Sheets

(56) References Cited

U.S. PATENT DOCUMENTS

| | | | | |
|---|---|---|---|---|
| 5,842,670 A * | 12/1998 | Nigoghosian | A45D 20/12 |
| | | | 248/910 |
| 5,881,983 A * | 3/1999 | Hofmann | A45D 20/12 |
| | | | 248/176.1 |
| 5,937,537 A * | 8/1999 | Miller | F16M 11/041 |
| | | | 34/97 |
| 6,199,805 B1 * | 3/2001 | Pena | F16M 11/28 |
| | | | 248/161 |
| RE38,897 E * | 11/2005 | Krenzel | F16M 13/00 |
| | | | 362/396 |
| 7,730,565 B1 * | 6/2010 | Masson | A61G 1/04 |
| | | | 5/503.1 |
| 7,861,985 B2 * | 1/2011 | Galvin | F16M 11/40 |
| | | | 455/575.1 |
| 8,151,481 B2 * | 4/2012 | Perez, Jr. | A45D 20/14 |
| | | | 248/205.8 |
| 9,945,510 B1 * | 4/2018 | Reitberger | F16M 11/105 |
| 10,081,382 B1 * | 9/2018 | Alton | F16M 11/40 |
| 11,382,716 B2 * | 7/2022 | Vipperman | A61B 90/57 |
| 11,470,985 B1 * | 10/2022 | Crowther | A61J 17/1115 |
| 11,627,212 B2 * | 4/2023 | Hatch | G08B 25/08 |
| | | | 361/679.01 |
| 2012/0091778 A1 * | 4/2012 | Johnson | A47C 7/383 |
| | | | 297/397 |
| 2013/0022395 A1 * | 1/2013 | Cowan | A45D 44/14 |
| | | | 403/376 |
| 2015/0118654 A1 * | 4/2015 | Phillips | A45D 44/14 |
| | | | 434/94 |
| 2015/0272348 A1 * | 10/2015 | Drake | A47F 5/08 |
| | | | 248/220.31 |
| 2022/0287680 A1 * | 9/2022 | Løype | A61B 8/12 |
| 2023/0061627 A1 * | 3/2023 | Humphries | A45D 44/04 |
| 2023/0091868 A1 * | 3/2023 | Schmidt | A45D 44/14 |
| | | | 297/188.04 |

\* cited by examiner

SHAMPOO STAND

BACKGROUND OF THE INVENTION

1. Field of the Invention

The present invention relates to a stand and, more particularly, to a shampoo stand that includes a mannequin head attached to a flexible and adjustable shaft, wherein the assembly can be attached to a shampoo chair to be handled as the user considers appropriate.

2. Description of the Related Art

Several designs for shampoo stands have been designed in the past. None of them, however, include a flexible and adjustable gooseneck, wherein the proximal end thereof includes a mannequin head used for beauty rehearse and at the distal end may include a clamp mechanism in order to be attached to a shampoo chair or a hair washing sink.

Applicant believes that a related reference corresponds to U.S. Pat. No. 5,156,365 issued for table-mountable support for a mannequin-head. Applicant believes that another related reference corresponds to U.S. Pat. No. 5,054,729 issued for a manikin head support. None of these references, however, teach of a support for a mannequin head comprising a flexible neck and a threaded adjustable clamp for attaching the support to a chair, sink, or table.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a device that is capable of being attached to a chair, sink or table for learning purposes.

It is another object of this invention to provide a device that is flexible and adjustable in order to be handled in a predetermined position by the user.

It is still another object of the present invention to provide a device that allows a mannequin head to be attached and detached.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
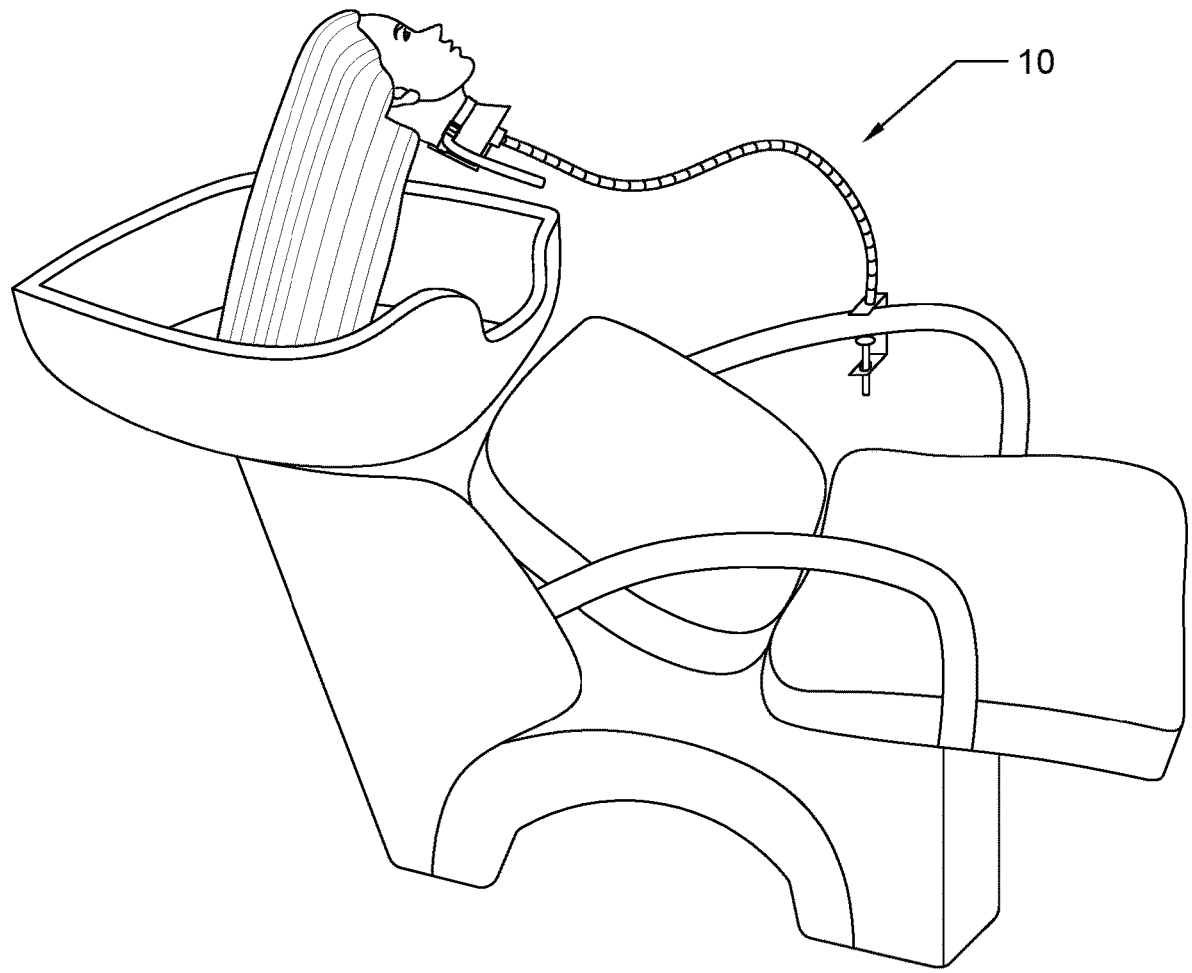
FIG. 1 represents an operation view of an exemplary embodiment of the present invention 10.

Referring now to the drawings, where the present invention is generally referred to with numeral 10, it can be observed that it basically includes a neck assembly 20, joining assembly 40, a support assembly 60 and various exemplary embodiments (100) thereof. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
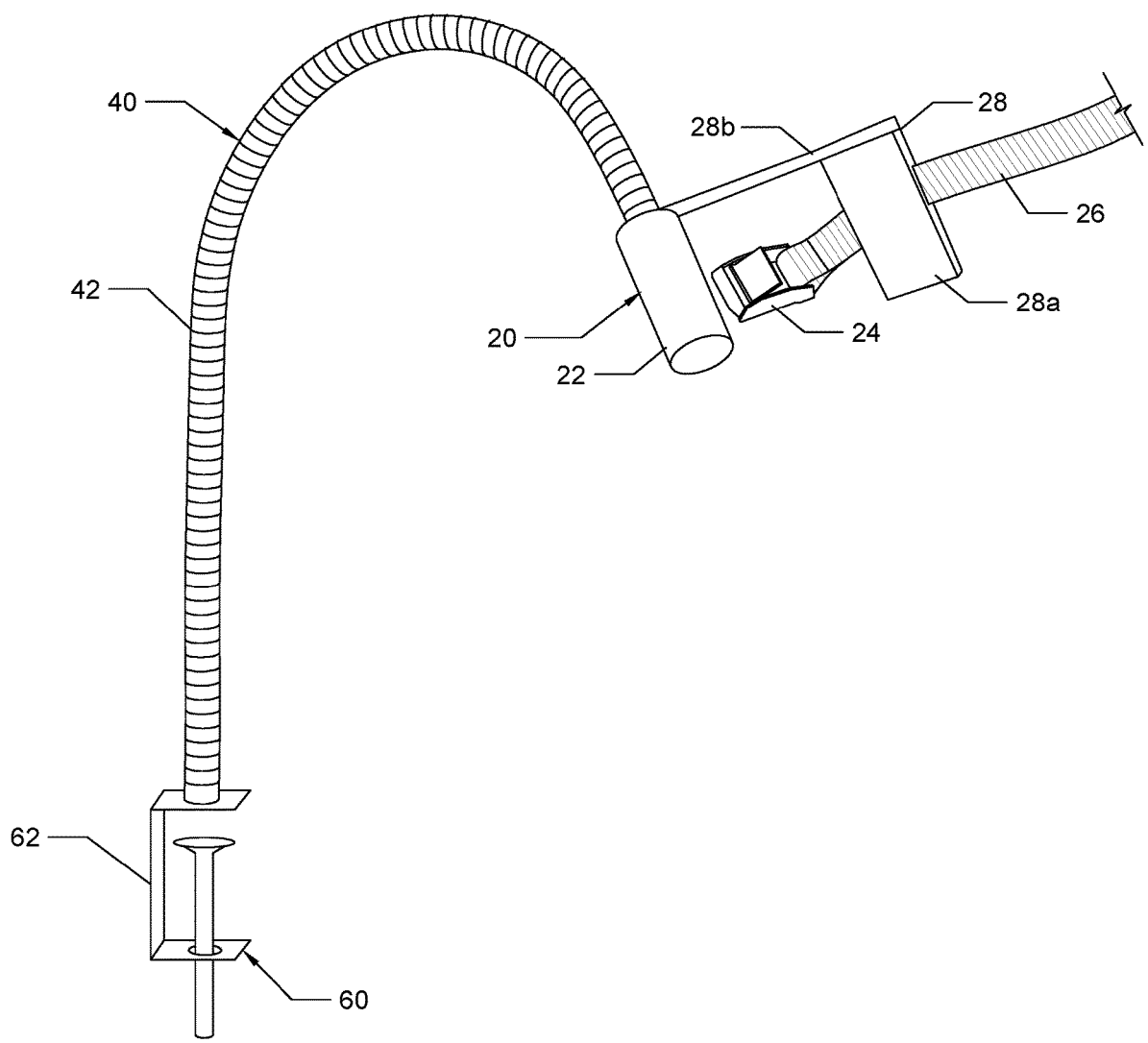
FIG. 2 shows an isometric view of the present invention 10, wherein on top of the gooseneck 42 is placed the neck assembly 20 and in a bottom edge thereof is placed the support assembly 62.
Figure 3:
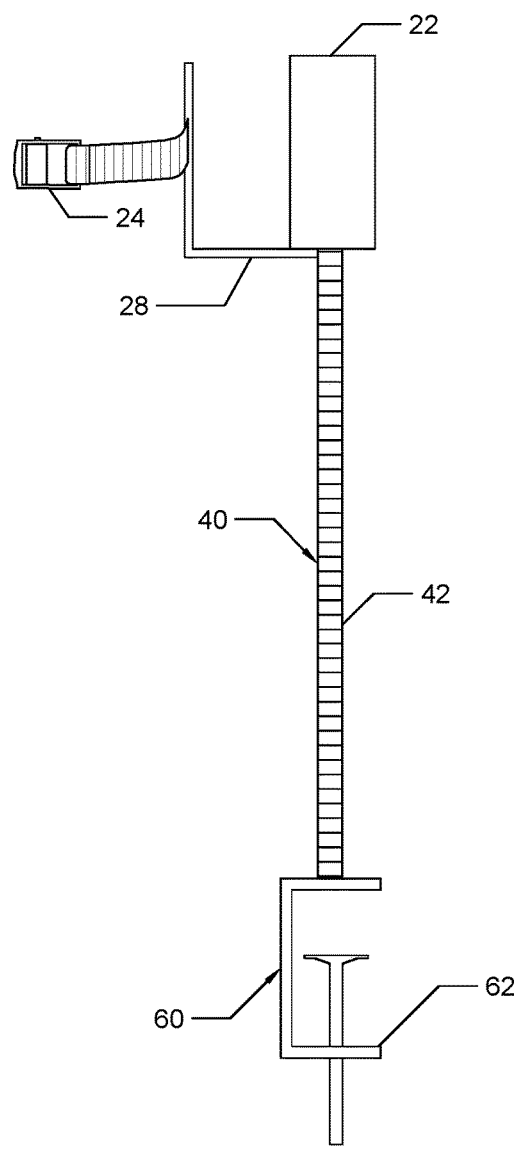
FIG. 3 illustrates a lateral view of the present invention 10, wherein the neck support 28 includes in one side the clamping lock 24.

Neck assembly 20 includes a support 22, a clamping lock 24, a strap 26 and a neck support 28. In an exemplary embodiment, the support 22 may have a cylindrical shape with a hollow body, nonetheless any other suitable shape that may fit into the open bottom of the mannequin head 100. As shown in FIG. 1. In a suitable embodiment, the support 22 may be made of hard plastic, carbon fiber, wood, aluminum, steel, or any other suitable material to support the weight of the mannequin head 100. In a preferred embodiment, the neck support 28 may be attached to a bottom edge of the support 22, wherein the neck support 28 may be a L-shaped support made of hard plastic, carbon fiber, wood, aluminum, steel, or any other suitable material to support a portion of the mannequin's neck. As best depicted in FIG. 1. It should be considered that the support 22 and the neck support 28 may be integrally formed, thereby the internal opening of the mannequin head 100 may receive the support 22 and the base 28b of the L-shaped neck support 28 in conjunction with the wall 28a thereof, may provide further support to the mannequin head 100. Referring to FIG. 2, the length of the base 28b of the neck support 28 may be suitable for the width of the mannequin head 100 starting from the center axis of the internal opening thereof, wherein the wall 28a of the neck support 28 may include in an edge thereof a clamping lock 24 and in the opposite edge a strap 26. In One embodiment the clamping lock 24 may be a strap attached to the lateral edge of the neck support 28 with a quick-release strap fastener in a distal end thereof. As FIG. 3 represents. In a suitable embodiment, referring to FIG. 4, the strap 26 may be attached to the opposite lateral edge of the neck support 28 with respect to the clamping lock 24, wherein the strap of the clamping lock 24 and the strap 26 may be made of a synthetic material, although any other suitable variation should be considered. In a preferred embodiment the clamping lock 24 may be a self-locking buckle with teeth, thereby the strap 26 may surround the circumference of the mannequin's neck and pass through the self-locking buckle and be secured by means the teeth when blocking, there by the mannequin head 100 is held in placed by means of the internal support 22 and the locking mechanism of between the clamping lock 24 and the strap 26.

Joining assembly 40 includes a gooseneck 42. In an exemplary embodiment, the gooseneck 42 may be a flexible and adjustable joining element, wherein the gooseneck 42 may have a semi-rigid body, thereby the gooseneck 42 may be positioned in a plurality of directions and remain in a predetermined position by means of the friction between an inner spiral and an outer casing that conforms the mechanism of the gooseneck 42. In a suitable embodiment, the gooseneck 42 may be formed by means of a combination between a round steel rod and a triangle steel rod or any other suitable variation thereof. It should be considered that the gooseneck 42 may be covered by a pliable plastic hose pipe, a silicon material, a fabric, or any other suitable and flexible coating. In a preferred embodiment, a proximal end of the gooseneck 42 may be attached to the bottom edge of the support 22, thereby the support 22, may be oriented in a predetermined orientation and remain the position by means of the gooseneck 42. As FIG. 2 illustrates.

Figure 4:
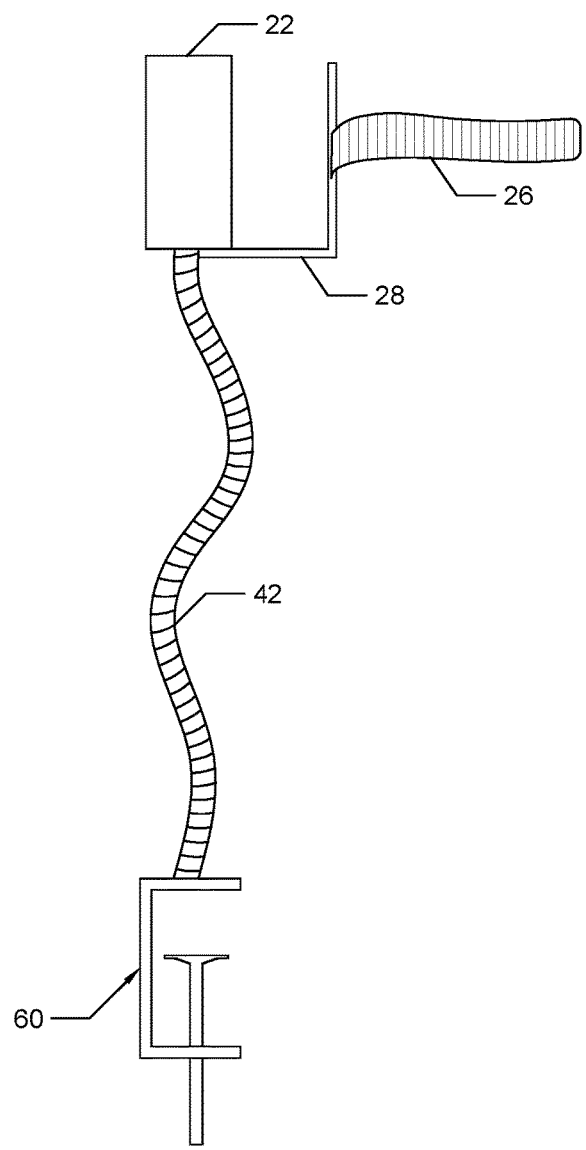
FIG. 4 is a representation of a present invention 10, wherein gooseneck 42 may be folded in a predetermined position and the neck support 28 includes in an opposite side the clamping a strap 28.

Support assembly 60 includes a clamp 62. In an exemplary embodiment, the clamp 62 may be attached at the distal end of the gooseneck 42, wherein said clamp 62 may be a table-clamp. As best depicted in FIG. 3. Nevertheless, it should be considered that the clamp 62 may be a c-clamp, a f-clamp, a clip-clamp, or any other suitable variation thereof. In a preferred embodiment the distal end of the gooseneck 42 may be attached to a top portion of the clamp 62, wherein the c-shape of the clamp 62 may be attached to an edge of a predetermined furniture. As FIG. 1 represents. In a suitable embodiment, the clamp 62 is used by means of turning the screw through the bottom of the frame that conforms the clamp 62 until the desired state of pressure or release is reached, thereby the clamp 62 may be secured to a predetermined furniture and the gooseneck 42 may be handled to a predetermined orientation. As FIG. 4 illustrates.

Referring to the figures and more particularly to FIG. 1, the clamp 62 may be attached to a hair washing sink or any other suitable furniture. Once the clamp 62 is tightened, the mannequin head 100 coupled to the support 22 may be handled to a predetermined orientation and remain that position by means of the gooseneck 42.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A shampoo stand, comprising:
   a neck assembly including a support, a clamping lock, a strap, and a neck support, wherein said support has a cylindrical shape to fit in the internal opening of a mannequin head, said support further includes a neck support, wherein said clamping lock and said strap are configured to secure said mannequin head when placed on said support;
   a joining assembly having a gooseneck, wherein said gooseneck is a semi-rigid and flexible hose, a proximal end of said gooseneck is attached to a bottom edge of said support, said gooseneck is made of a combination of a round spring material and triangle rods, wherein said neck support is a L-shaped neck support attached to the bottom edge of the support, wherein a base of said L-shaped neck support is parallel with respect to the bottom edge of said support wherein a wall of said L-shaped neck support is perpendicular with respect to said base and parallel with a curved shape of said support, wherein said wall of said L-shaped neck support has a separation with respect to said support, wherein a portion of a neck of said mannequin head is placed between said L-shaped neck support and said support; and
   a support assembly including a clamp assembly, wherein a top portion of said clamp is attached to a distal end of said gooseneck, wherein said clamp is a C-clamp said clamp is configured to be tightened to a predetermined surface.

2. The shampoo stand of claim 1, wherein said gooseneck is capable of being folded, wherein said folded configuration is retained by means of the friction between said round spring material and said triangle rods.

3. A shampoo stand, comprising:
   a neck assembly including a support, a clamping lock, a strap, and a neck support, wherein said support has a cylindrical shape to fit in the internal opening of a mannequin head, said support further includes a neck support, wherein said clamping lock and said strap are configured to secure said mannequin head when placed on said support, wherein said neck support is a L-shaped neck support attached to the bottom edge of the support, said L-shaped neck support is parallel with respect to the bottom edge of said support, wherein a wall of said L-shaped neck support is perpendicular with respect of said base and parallel with a curved shape of said support, wherein said wall of said L-shaped neck support has a separation with respect to said support, wherein a portion of a neck of said mannequin head is placed between said L-shaped neck support and said support;
   a joining assembly having a gooseneck, wherein said gooseneck is a semi-rigid and flexible hose, a proximal end of said gooseneck is attached to a bottom edge of said support, said gooseneck is made of a combination of a round spring material and triangle rods, wherein said gooseneck is capable of being folded into a predetermined orientation; and
   a support assembly including a clamp assembly, wherein a top portion of said clamp is attached to a distal end of said gooseneck, said clamp is a C-clamp, said clamps is configured to be tightened to a predetermined surface.

* * * * *